(12) United States Patent
Kieda et al.

(10) Patent No.: US 6,346,754 B1
(45) Date of Patent: Feb. 12, 2002

(54) ELECTRIC ROTATING MACHINE

(75) Inventors: Shigekazu Kieda, Ishioka; Hideaki Mori, Chiyoda; Ryoichi Shiobara; Kenichi Hattori, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/579,523

(22) Filed: May 26, 2000

(30) Foreign Application Priority Data

Jun. 2, 1999 (JP) .............................. 11-155506

(51) Int. Cl.[7] .............................. H02K 3/24; H02K 3/26
(52) U.S. Cl. .......................... 310/58; 310/59; 310/60 R; 310/61; 310/270
(58) Field of Search ........................ 310/52, 58–60 A, 310/270, 91

(56) References Cited

U.S. PATENT DOCUMENTS 2,844,746 A * 7/1958 Coggeshall ................. 310/270
4,656,382 A * 4/1987 Moore et al. ................ 310/270
6,087,745 A * 7/2000 Dreher ......................... 310/58
6,194,807 B1 * 2/2001 Kaminski et al. ............ 310/270

FOREIGN PATENT DOCUMENTS

JP 951644 2/1997

* cited by examiner

Primary Examiner—Tran Nguyen
(74) Attorney, Agent, or Firm—Antonelli, Terry, Stout & Kraus, LLP

(57) ABSTRACT

For obtaining an electric rotating machine being constructed cheaply, while cooling capacity at the end portions of the rotor coils can be improved, and being small in the size and large in the capacity, with superior reliability thereof, in an electric rotating machine, within which a coolant fluid is circulated, wherein coil support members 13 are positioned at a distance therebetween, in a space defined between the end portions 12B of the plural rotor coils, each of the coil support members 13 is formed with two (2) insertion portions 13a extending in a radial direction and a connector portion 13b connecting therebetween, as one body and in an about "H" shape in the cross-section, thereby forming spaces 13c, each of which faces the end portion 12B of the rotor coil, at both sides of the connector portion 13b.

6 Claims, 7 Drawing Sheets

FIG. 11 - PRIOR ART
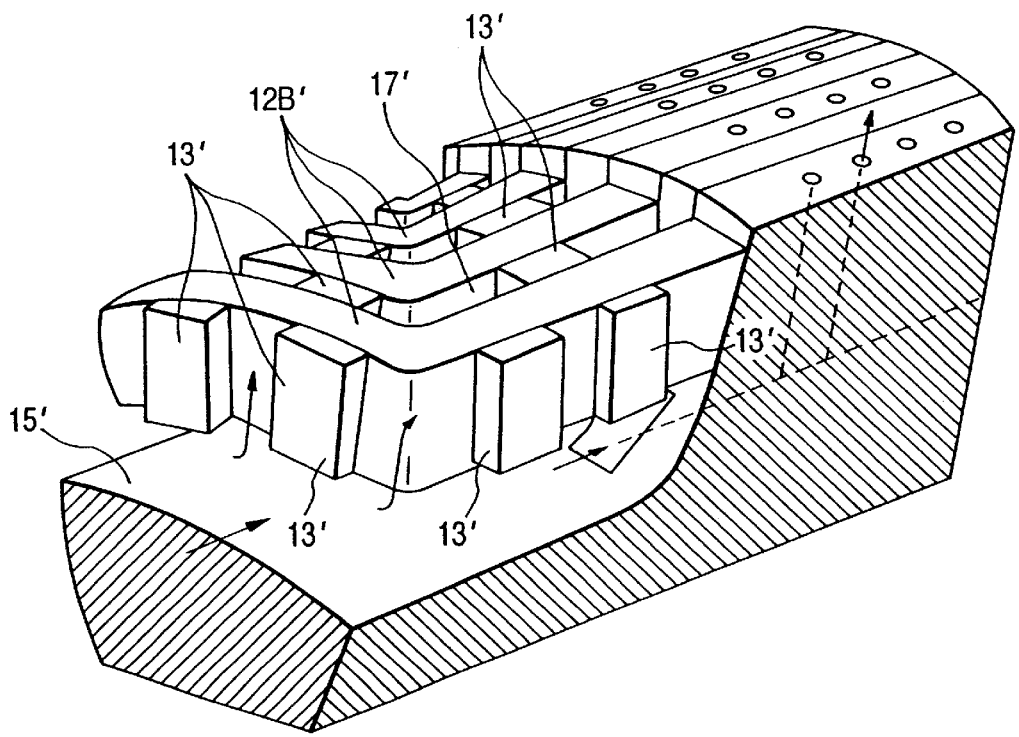
FIG. 12 - PRIOR ART
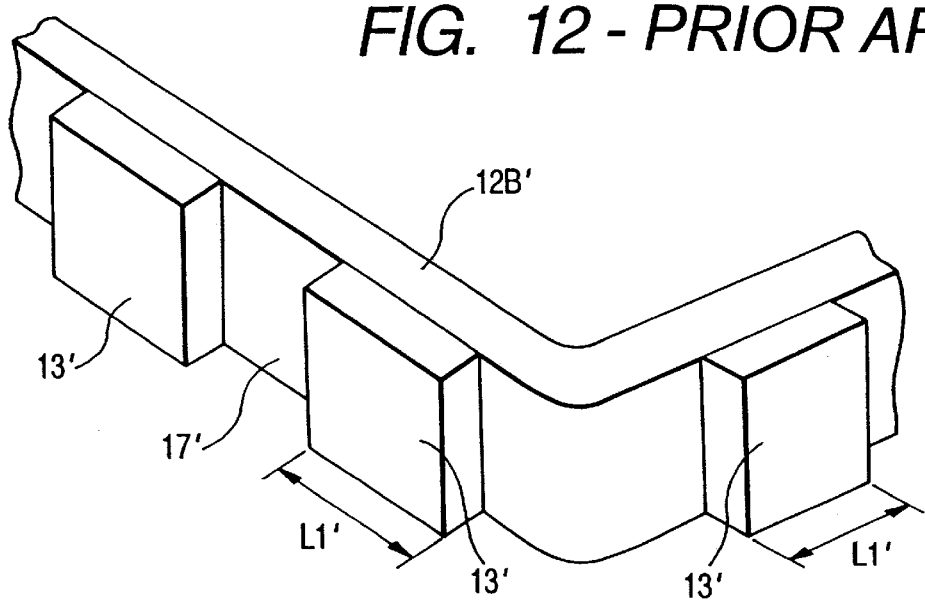

ELECTRIC ROTATING MACHINE

BACKGROUND OF THE INVENTION

The present invention relates to an electric rotating machine, in particular being suitable for applying to the electric rotating machine of direct gas cooling type having a large capacity.

In a conventional generator, in particular, in a turbine generator, a rotor is constructed by inserting a plurality of rotor coils into slots which are formed around a rotor core in the axial direction thereof. Those slots of the rotor are provided on an outer periphery surface of the rotor at a distance therebetween, at both sides of magnetic poles of the rotor core thereof, wherein the plurality of the rotor coils constructing the same magnetic pole are positioned concentrically around the magnetic pole. Those rotor coils are formed by accumulating the coil conductors in a radial direction in plural number of turns, and between the turns is provided an insulating layer. When turning on current to those rotor coils from an outside, necessary electromagnetic fields are generated round the magnetic poles, respectively. Those rotor coils are fixed strongly by means of wedges inside the slots so that they will not jump out into the outer radial direction thereof due to powerful or strong centrifugal force accompanies with rotation of the rotor, and at the edge portions of the rotor coils extending outside the rotor slots, they are held by means of cylindrical support rings, which are positioned to contact on the outer periphery of the end portions of the coils.

Turning on the current into the rotor coils, the Joule's heat is generated in the conductor of the coils. As the insulator layers of the rotor coils are used a material having high thermal resistance, such as mica, etc., however there is a limit in the heatproof temperature thereof, therefore there is a tendency that the higher the heatproof temperature the higher the cost thereof. Also, the thermal expansion of the coil conductor accompanying with the rise-up of temperature gives a large stress or strain on the rotor coils, in particular on the end portions thereof protruding outside the rotor slots, thereby sometimes causing a rotational vibration.

In the structure for cooling the end portions of the rotor coils, according to the conventional turbine generator, as is disclosed in Japanese Patent Laying-Open No. Hei 9-51644 (1997) for example, while putting between each of the rotor coils protruding outside the rotor slots a coil support member which extends in a longitudinal direction thereof, a coil support seat is put between the each rotor coil and the coil support member, so as to form a conducting groove communicating between the coil support member and the coil support seat in the longitudinal direction of the coils, thereby circulating a coolant fluid between the coil support member and the rotor coil and into the conducting groove so as to cool the coils (conventional art 1).

On a while, as the structure for cooling the end portions of the rotor coils in the turbine generator, there can be considered a one, as shown in FIGS. 11 and 12, wherein between the plurality of the end portions 12B' of the rotor coils are constructed the coil support member 13' and an inter support member space 17' being adjacent thereto, alternatively, in the longitudinal direction of the coils, and the inter support member spaces 17' are communicated to a coil inner-periphery side gap 15' on an inner periphery side thereof, to perform the cooling due to thermal siphon effect in the inter support member spaces 17' (conventional art 2).

In recent years, there is a tendency of bringing the generator small-sized or in a large capacity, and the density of heat generation in the rotor coils rises up, therefore there is a necessity of improvement in the cooling performance thereof. However, according to those of the conventional arts 1 and 2, the coil support seats and the coil support members contact with the rotor coils totally. Because of this, the power or capacity of cooling from the surface of the rotor coils, on which the coil support seats and the coil support members lie, is low. Namely, since insulating property is necessary for the coil support seats and the coil support members, ordinarily they must be made from a material having a low thermal conductivity. Therefore, the surface, on which the coil support seats and the coil support members contact with the end portions of the rotor coils, is nearly in a condition that it is thermally insulated, then the cooling area for cooling the end portions of the rotor coils is reduced down by that.

Also, in that of the conventional art 1, there are used the two (2) kinds of materials, such as the coil support member and the coil support seats lying between at both sides thereof, therefore workability is bad in particular in the insertion of those members.

On a while, in the construction of the conventional art 2, the size L1' of the coil support member 13' in the longitudinal direction of the coil must be large in a certain degree from a view point of the workability in insertion and the strength of the coil support member 13'. Because of this, the cooling area of the coils is reduced down by the coil support members 13' greatly.

OBJECT AND SUMMARY OF THE INVENTION

An object of the present invention is to provide an electric rotating machine, which can be constructed cheaply while improving the cooling capacity at the end portions of the rotor coils, as well as being small in the size and large in the capacity, with superior reliability thereof.

For accomplishing the object mentioned above, in accordance with the present invention, first of all, there is provided an electric rotating machine, having a stator, a rotor being positioned rotatable within the stator, and a communicating apparatus for communicating a coolant fluid within said electric rotating machine, wherein said rotor comprises: a rotor core in which a plurality of rotor slots are provided; a plurality of rotor coils, each of which is inserted into said rotor slot at a central portion thereof and protrudes end portions thereof outside said rotor slot; and a coil support member having insulating property, being positioned between the plurality of end portions of the rotor coils, wherein at an inner peripheral side of said plural end portions of the rotor coils is formed a coil inner peripheral side aperture which is communicated with said coolant, and in said coil support member is formed a recess portion, thereby to form a space facing a surface of said rotor coil, and said space being communicated with said coil inner peripheral side aperture at the inner peripheral side thereof.

Secondly, according to the present invention, there is provided an electric rotating machine, having a stator, a rotor being positioned rotatable within the stator, and a communicating apparatus for communicating a coolant fluid within said electric rotating machine, wherein said rotor comprises: a rotor core in which a plurality of rotor slots are provided; a plurality of rotor coils, each of which is inserted into said rotor slot at a central portion thereof and protrudes end portions thereof outside said rotor slot; and a plurality of coil support members having insulating property, being positioned between the plurality of end portions of the rotor coils at a distance therebetween, wherein at an inner peripheral side of said plural end portions of the rotor coils is formed a coil inner peripheral side aperture which is communicated with said coolant fluid, said coil support members and inter support member spaces adjacent thereto are positioned alternately, in a longitudinal direction of said coils, between the end portions of said plural rotor coils, while said inter support member spaces are communicated with said coil inner peripheral side aperture at inner peripheral side thereof, and in each of said coil support members is formed a recess portion to form an inner-support member space facing a surface of said rotor coil, thereby said inner-support member spaces being communicated with said coil inner peripheral side aperture at the inner peripheral side thereof.

Thirdly, according to the present invention, there is provided an electric rotating machine, having a stator, a rotor being positioned rotatable within the stator, and a communicating apparatus for communicating a coolant fluid within said electric rotating machine, wherein said rotor comprises: a rotor core in which a plurality of rotor slots are provided; a plurality of rotor coils, each of which is inserted into said rotor slot at a central portion thereof and protrudes end portions thereof outside said rotor slot; and a plurality of coil support members having insulating property, being positioned between the plurality of end portions of the rotor coils at a distance therebetween, wherein at an inner peripheral side of said plural end portions of the rotor coils is formed a coil inner peripheral side aperture which is communicated with said coolant fluid, each of said coil support members comprises insertion portions, which are extended in a radial direction and are formed in plural in a longitudinal direction of the coil, while abutting upon a surface of said rotor coil at both surfaces thereof, and a connector portion for connecting between said plural insertion portions, as one body, thereby forming inner-support member spaces between said insertion portions, each of which faces said rotor coil, and a recess portion is formed so that said inner-support member spaces are communicated with said coil inner peripheral side aperture at the inner peripheral side thereof.

Fourthly, according to the present invention, there is provided an electric rotating machine, having a stator, a rotor being positioned rotatable within the stator, and a communicating apparatus for communicating a coolant fluid within said electric rotating machine, wherein said rotor comprises: a rotor core in which a plurality of rotor slots are provided; a plurality of rotor coils, each of which is inserted into said rotor slot at a central portion thereof and protrudes end portions thereof outside said rotor slot; a coil support members having insulating property, being positioned between the plurality of end portions of the rotor coils at a distance therebetween; and a retaining ring being positioned so that it holds said plural end portions of the rotor coils and said coil support member at an outer periphery thereof, wherein at an inner peripheral side of said plural end portions of the rotor coils is formed a coil inner peripheral side aperture which is communicated with said coolant fluid, said coil support members and inter support member spaces adjacent thereto are positioned alternately, in a longitudinal direction of the coils, between the end portions of said plural rotor coils, while said inter support member spaces are communicated with said coil inner peripheral side aperture at inner peripheral side thereof, said coil support member is formed with insertion portions which are extended in a radial direction and are formed in plural in a longitudinal direction of the coil, while abutting upon a surface of said rotor coil at both surfaces thereof, and a connector portion for connecting between said plurality of insertion portions, as one body in an about "H" shape in cross-section thereof, so as to form inner-support member spaces at both sides of said connector portion, each of which faces the end portion of said rotor coil, and those inner-support member spaces are communicated with said coil inner peripheral side aperture at the inner peripheral side thereof.

Preferably, in the above, a coil outer peripheral side cooling passage is formed at an outer periphery of the end portions of said rotor coils, and a communication passage is provided in said coil support member so that said inner-support member space and said coil outer peripheral side cooling passage are communicated with.

Also, preferably in the above, a communication passage is formed in said coil support member so as to communicate between said inner-support member space and other inter support member space.

BRIEF DESCRIPTION OF THE DRAWINGS

FIG. 11 is a perspective view of the end portion of the rotor in a conventional electric rotating machine; and FIG. 12 is a perspective view for illustrating the end portion of the rotor coil and coil support members in the end portion of the rotor shown in the FIG. 11.

DESCRIPTION OF THE EMBODIMENTS

Hereinafter, embodiments according to the present invention will be fully explained by referring to the attached drawings.

Figure 1:
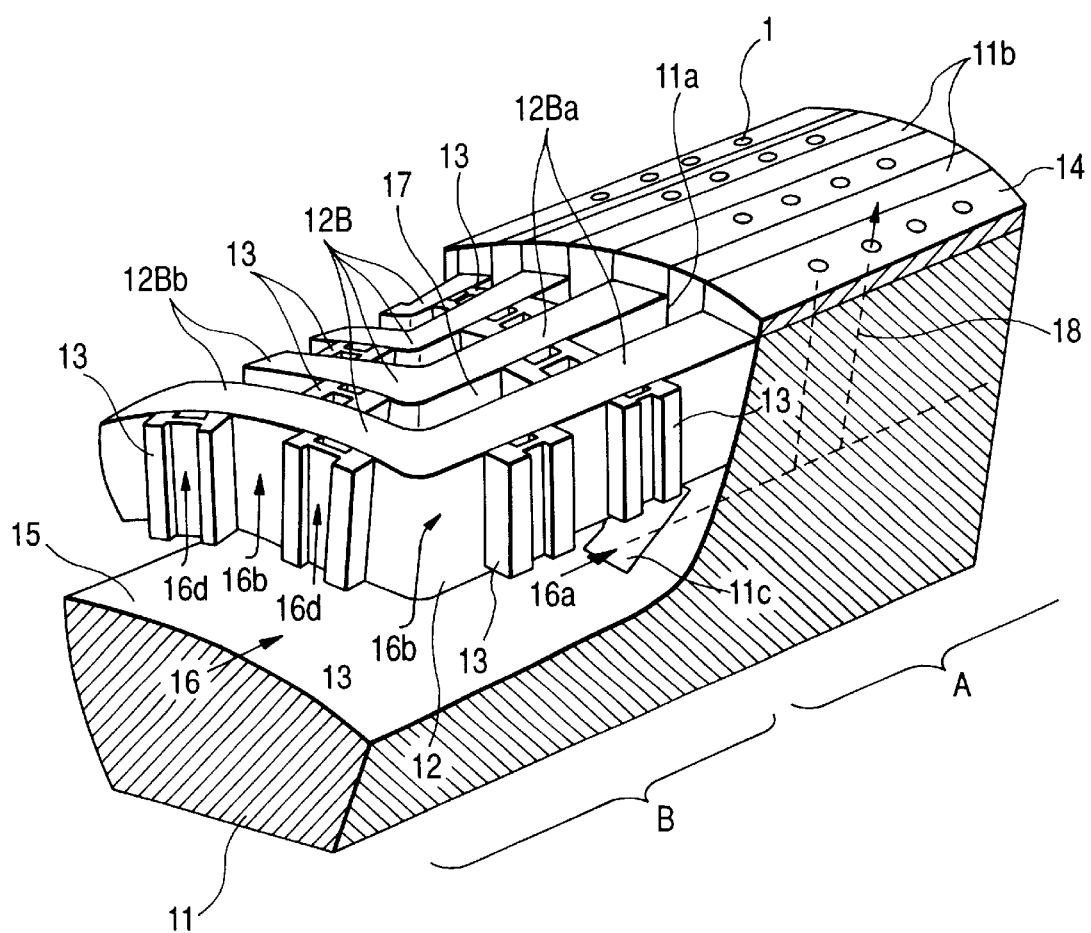
FIG. 1 is a perspective view for showing the end portion of the rotor of an electric rotating machine, according to a first embodiment of the present invention.
Figure 2:
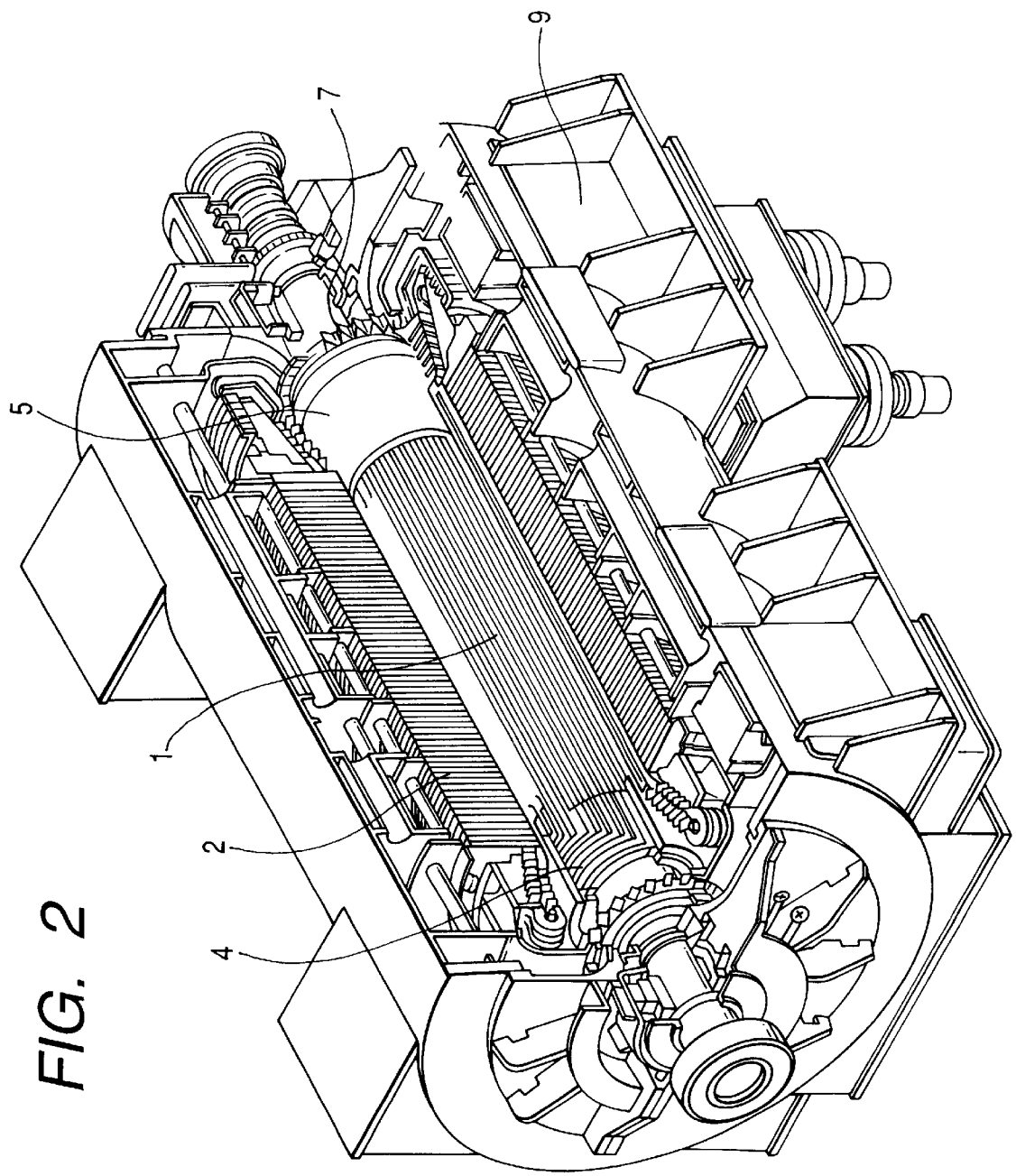
FIG. 2 shows a perspective view for illustrating an outline structure of the electric rotating machine according to the present invention.
Figure 3:
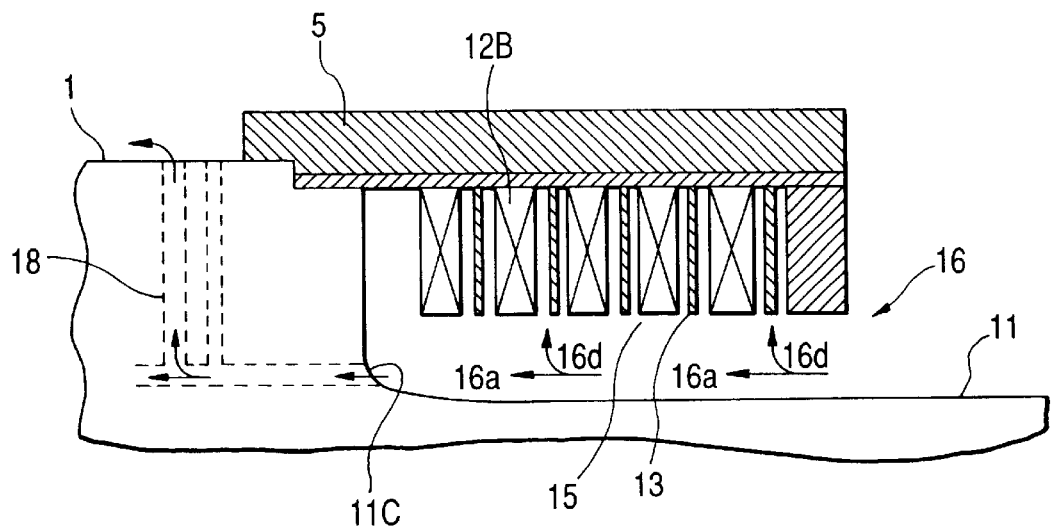
FIG. 3 is a cross-section view of the end portion of the rotor shown in the FIG. 1, in particular in a circular direction thereof.
Figure 4:
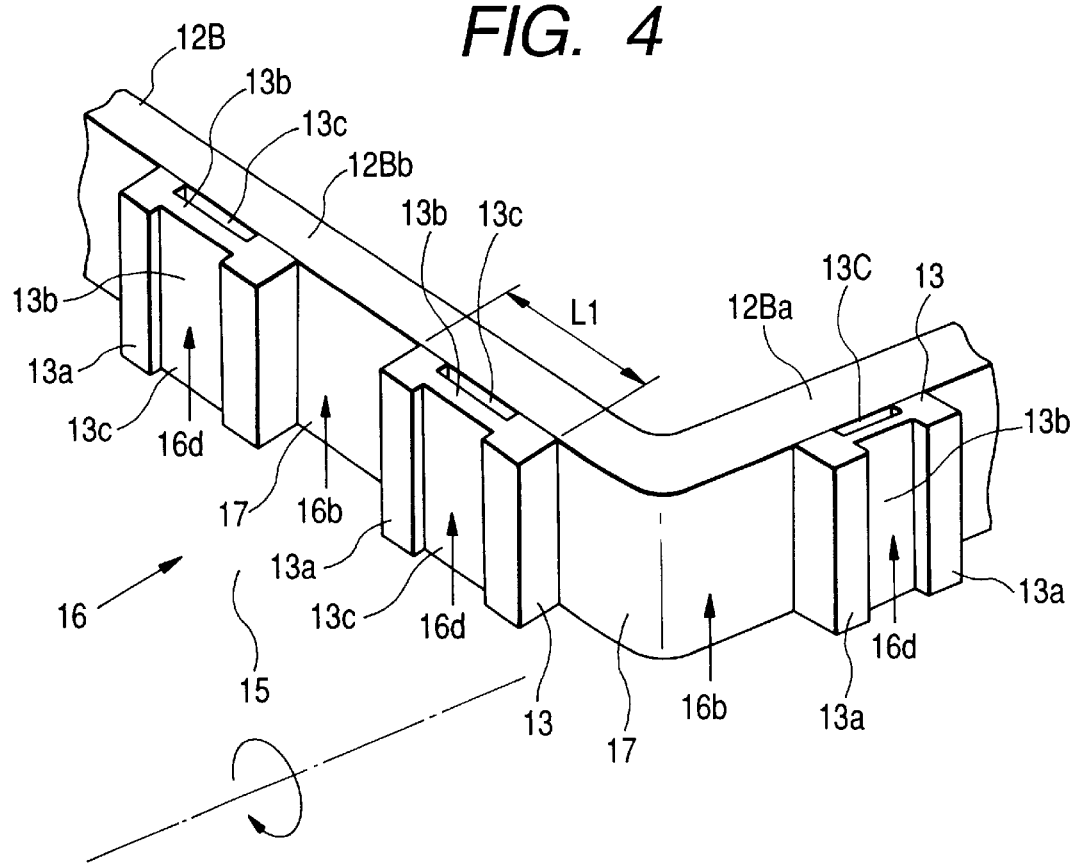
FIG. 4 is a perspective view for illustrating the end portion of the rotor coil and coil support members in the end portion of the rotor shown in the FIG. 1.
Figure 5:
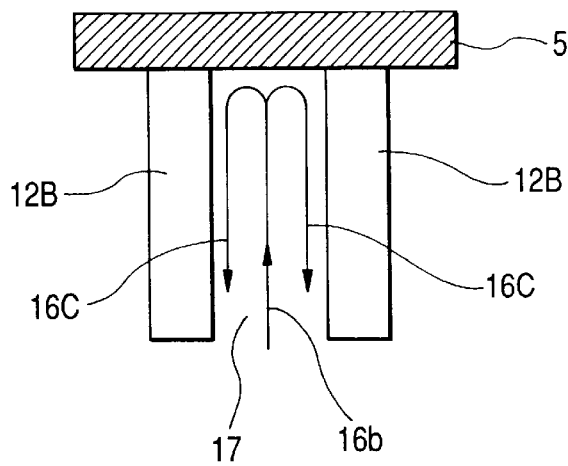
FIG. 5 is a typical view for illustrating thermal siphon effect in the end portion of the rotor shown in the FIG. 1.

First, explanation will be given on an outline structure of an air cooling type turbine generator, according to the present invention, by referring to FIG. 2. In this embodiment, the explanation will be given on that, in which the air is applied as a fluid of coolant, however it may be a fluid other than the air. A rotor 1 is supported within a stator 2, being freely ratable. A plurality of rotor coils 4, which construct the same magnetic pole, are fixed on the rotor 1, while being positioned around the magnetic pole concentrically. Portions of those rotor coils 4, extending in the axial direction, are held in rotor slots which are formed on an outer surface of the rotor 1 at a distance therebetween. Also, the portions of the rotor coils 4, protruding outside the rotor slots are held by means of a retaining ring 5. The structure of the end portions of the rotor will be mentioned later. Outside of the holder ring 5 is provided a circulating apparatus 7 of the fluid of coolant, and by means of this circulating apparatus 7 is circulated the fluid of coolant within an inside of the generator. Ducts are provided so that the air circulated by the circulating apparatus 7 can be supplied to the rotor 1, the stator 2, etc. The stator 2 is supported by means of the stator frame 9, and the stator frame 9 is fixed on a base.

Next, explanation will be given on a first embodiment of the rotor of the turbine generator, according to the present invention, by referring to FIGS. 1, 3–5.

The rotor 1 comprises: a rotor core 11 having the rotor slots 11a in a plurality thereof; a plurality of rotor coils 12, each being inserted into the rotor slot 11a at the central portion thereof and being protruded outside the rotor slot 11a at the end portion 12B thereof; a plurality of coil support members 13 having an insulation property, each of which is positioned at a distance between the plural rotor coils 12, protruding between the end portions 12B of the plural rotor coils; and a holder ring 5 which is positioned so that the end portions 12B of the plurality of rotor coils and the coil support members 13 are held at the outer peripheries thereof. Also, the rotor 1 is indicted, being divided into a body or trunk portion A and the end portion B.

The rotor coil 12 is inserted into a rotor slot 11a within the aperture of the teeth 11b which is provided in the trunk portion A of the rotor core 11, and is pressed down by a wedge 14 from outer periphery, thereby to prevent the rotor coil 12 from being moved by the centrifugal force thereto. Also, the end portion B of the rotor core 11 is cut or hollowed in an outer periphery portion thereof, wherein the end portion 12B of the rotor coils 12B are positioned so that they are turned round from the axial direction portion 12Ba into the peripheral direction portion 12Bb. And, at the outer periphery side 12B of the end portion of the rotor coil is provided the cylindrical retaining ring 5, so as to support the coil against the force directing outward in the radial direction due to the centrifugal force.

At the end portion 12B of the rotor coil, the coil support members 13 are inserted into the aperture between the coils, for the purpose of supporting the end portion 12B of the rotor coil, so that the coil aperture is constructed with the coil support members 13 and an inter support member spaces 17 (i.e., a space between the support members) being adjacent thereto, alternately in the longitudinal direction of the coil. At inner peripheral side of the end portion 12B of the rotor coil, there is provided a coil inner peripheral side aperture 15 (i.e., an aperture at the inner periphery of coil) for the purpose of cooling the rotor coil 12, into which the coolant fluid 16 is introduced. The inter support member spaces 17 is communicated to the coil inner peripheral side aperture 15 at the inner periphery side thereof. A portion 16a of the coolant fluid 16 flows, so that it passes through the slot 11c provided in the trunk body A, rotor coil 12 and a trunk cooling path 18 provided in the wedge 14 into the radial direction, thereby performing the cooling thereof.

On a while, a portion 16b of the coolant fluid 16 flows into the inter support member spaces 17 which constructs the aperture at the end portion 12B of the rotor coil, thereby cooling the end portion 12B thereof. This inter support member space 17 is enclosed all the outer sides, except for the inner peripheral side thereof, however in a case where the centrifugal force due to the rotation of the rotor acts upon the coolant fluid within the inter support member spaces, it flows, as is indicated by arrows in the FIG. 5, so as to form the thermal siphon therewith, thereby cooling the end portion 12B of the rotor coil. The reason of forming such the thermal siphon is as follows. Namely, the coolant fluid 16b of low temperature flows into an outer peripheral direction by means of the centrifugal force, however the temperature of it rises up in the temperature by heating of the wall surface of the rotor coil. Accordingly, the fluid is decreased down in the density, thereby forming the flow into the inner peripheral direction. This coolant fluid 16c flowing into the inner peripheral direction is decreased down in the centrifugal force acting in the outer peripheral direction, comparing to that of the flow-in fluid 16b being larger in the density thereof, therefore it flows out in a manner that it is relatively excluded by the flow-in fluid 16b.

Also, the coil support members 13 which are inserted between the end portions 12B of rotor coils are for the purpose of suppressing the positional movement of the rotor coil 12 caused due to the thermal expansion and the centrifugal force, however due to the necessity of satisfying workability in insertion by decreasing down the number of parts, are preferable to be long in the longitudinal direction of coil at the side contacting to the end portion 12B of the rotor coil, i.e., it is preferable that the side length L1 is longer by a certain degree in the circumference direction or in the axial direction but it does not obstruct the cooling of the rotor coil 12.

Then, the coil support members 13 is constructed with insertion portions 13a being formed in two (2) at both sides of the longitudinal direction of the coil, each of which is elongated over entire size of the coil in the radial direction and abuts upon the surfaces of the rotor coils 12, and a connector portion 13b connecting those two insertion portions 13a, as one body in a shape of about "H" in the cross-section. With this, at the both ends of the connector portion 13b are defined recess portions, then the each recess portion forms an inner support member space 13c facing the end portion 12B of the rotor coil. This inner support member space 13c is communicated with the coil inner periphery side aperture 15 at the inner periphery side thereof.

With the provision of the inner support member space 13c in the coil support member 13 in this manner, a portion 16d of the coolant fluid 16 into the inner support member space 13c, it is possible to cool down the end portion 12B of the rotor coil which faces on the inner support member space 13c, directly, thereby increasing the thermal transfer area and improving the performance of cooling thereof. Though the inner support member space 13c is closed at all surfaces thereof except for a lower end as an inlet opening of the coolant fluid, however the coolant fluid does not stay within due to the thermal siphon effect, being same to that which was explained in the FIG. 5, thereby conducting the cooling.

In accordance with the present invention, the coil support members 13 are positioned between the plurality of the end portions 12B of the rotor coils, while forming the spaces 13c facing the rotor coils 12, and the recess portions are formed in the coil support member 13 so that those spaces 13c are communicated with the coil inner periphery side aperture 15 at the inner periphery side thereof, therefore it is possible to cool the surface of the end portions 12B of the rotor coils by means of the coolant fluid flowing into the spaces 13c which are defined by the recess portions, directly, with a simple construction of forming the recess portions. With this, it is possible to improve the cooling capacity of the end portions 12B of the rotor coils with cheap structure, thereby obtaining the small-sizing and the large capacity of the electric rotating machine being superior in the reliability thereof.

Also, with provision of the coil support members 13 and the inter support member spaces 17 being adjacent thereto, alternately, in the longitudinal direction of the coils between the end portions 12B of the rotor coils, the inter support member spaces 17 are communicated to the coil inner periphery side aperture 15 at the inner periphery side thereof, therefore the inter support member spaces 17 as a whole can be used as the spaces for direct use in cooling of the end portions of the rotor coils, with the simple construction. With this, it is possible to increase up the cooling capacity in the inter support member spaces 17 with the cheap construction, and to improve the cooling capacity in the end portions 12B of the rotor coils more, together with the function of direct cooling of the end portions 12B of the rotor coils in the coil support members 13, and it is further possible to obtain the small-sizing and the large capacity of the electric rotating machine being superior in the reliability thereof.

Furthermore, the coil support member 13 has the plurality of insertion portions 13a, each of which extends in the radial direction and abuts on the rotor coils at both surfaces thereof, and the connector portion 13b connecting those insertion portions 13a, as one body, and the recess portions are provided between those insertion portions 13a so that the inner support member spaces 13c facing the rotor coils 12 are communicated with the coil inner periphery side aperture 15 at the inner periphery side thereof, therefore it is possible, while maintaining the direct cooling function of the end portions 12B of the rotor coils in the inner support member spaces 13c, to prevent the rotor coils 12 from coil deformation over the radial direction thereof by means of the insertion portions 13a with certainty, as well as to prevent from the coil deformation over the longitudinal direction of the coils by means of the plurality of insertion portions 13a of the each coil support member 13, and furthermore it is possible to improve the workability in inserting the coil support members 13 by means of the insertion portions 13a which are connected in one body.

Also, the coil support member 13 is formed with the two (2) insertion portions 13a and the connector portion 13b connecting therebetween, as one body of about "H" shape in the cross-section thereof, and is formed with the inner support member spaces 13c facing the end portions 12B of the rotor coils at the both sides thereof, therefore it is possible, while preventing from the coil deformations over the radial direction and the longitudinal direction of the rotor coils 12 with certainty, to let the coil support members 13 to have the strong strength therewith, thereby enabling to cool the both surfaces of the end portion 12B of the rotor coil by means of the two (2) inner support member spaces 13c directly, so as to obtain the machine being more superior in the reliability thereof.

Figure 6:
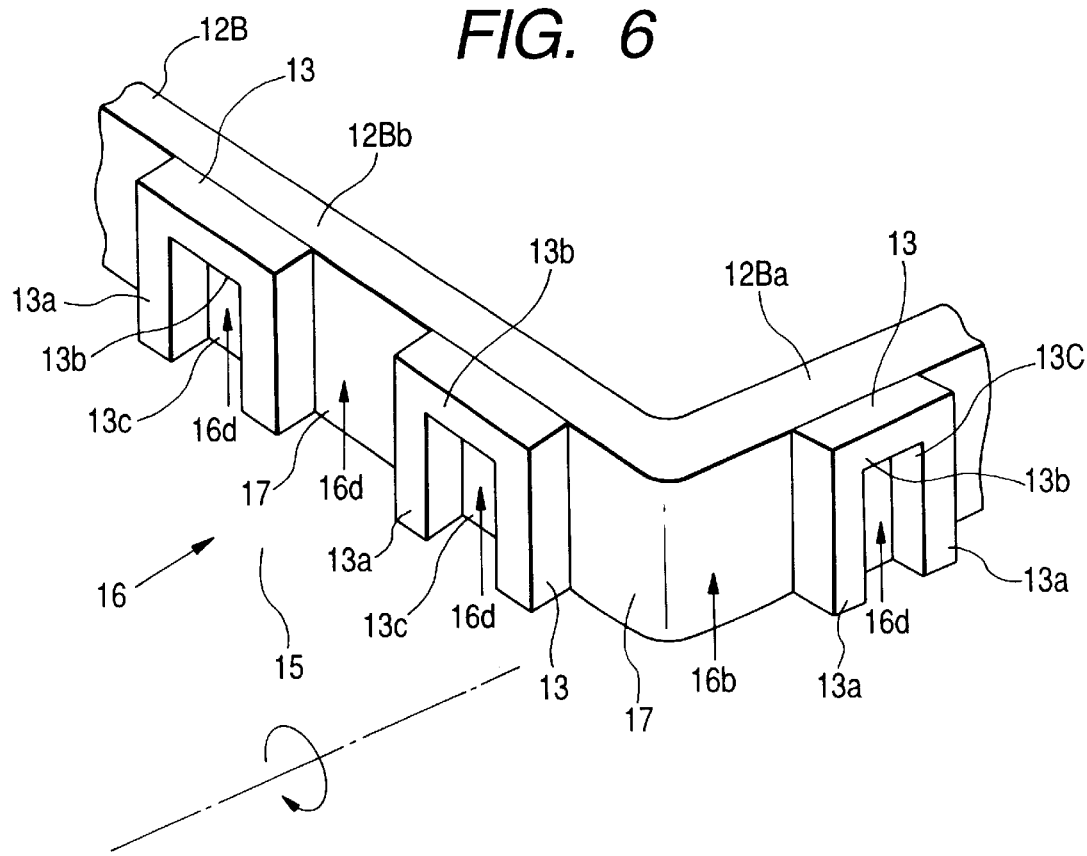
FIG. 6 is a perspective view for illustrating the end portion of the rotor coil and coil support members in the end portion of the rotor of the electric rotating machine, according to a second embodiment of the present invention.

Next, explanation will be given on a second embodiment of the electric rotating machine, according to the present invention, by referring to FIG. 6. That shown as this second embodiment differs from the first embodiment in the construction of the coil support members 13. Namely, the support member 13 is formed so that the connector portion 13b connects between the insertion portions 13a at the upper portions thereof, and the inner support member space 13c is defined by the recess portion which is enclosed by the inner surfaces of the insertion portions 13a and the connector portion 13b. The inner support member space 13c is communicated to the coil inner periphery side aperture 15 at the inner periphery side thereof. In this second embodiment, the structures being similar to that in the first embodiment also achieves the same effects to those.

Figure 7:
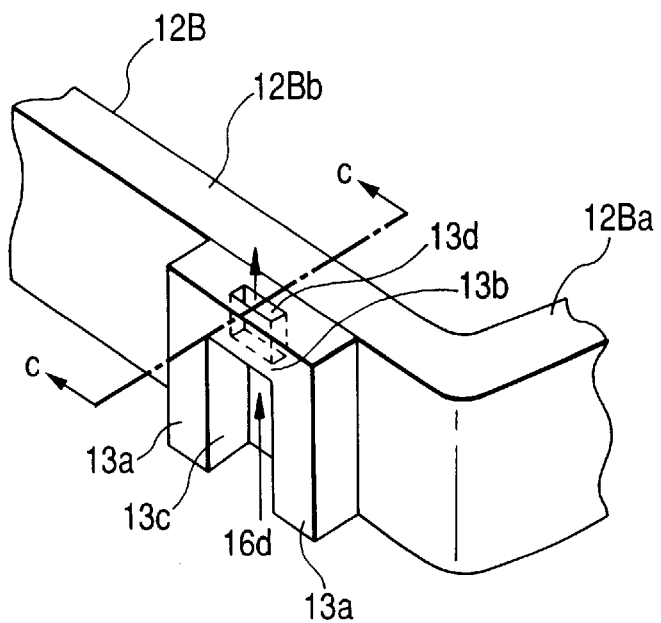
FIG. 7 is a perspective view for illustrating the end portion of the rotor coil and coil support members in the end portion of the rotor of the electric rotating machine, according to a third embodiment of the present invention.
Figure 8:
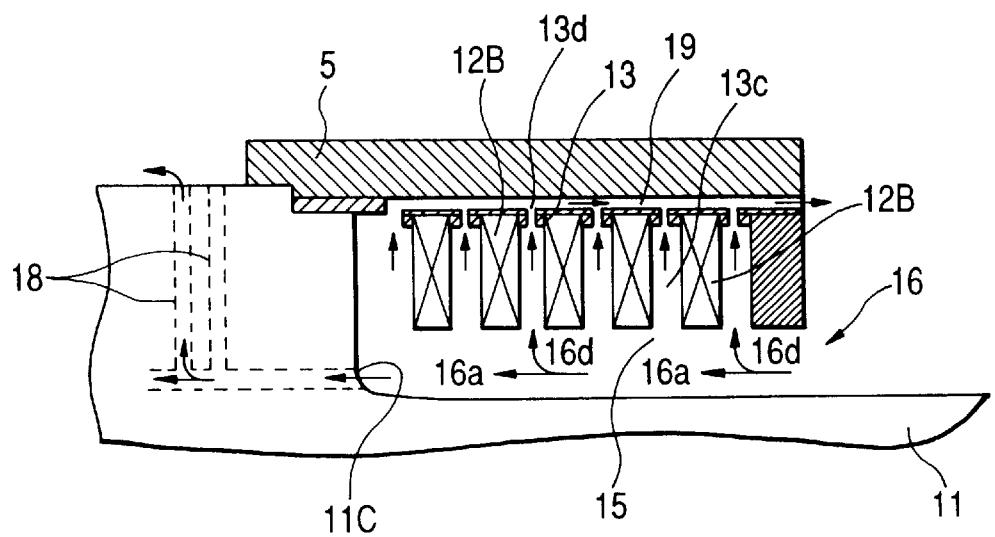
FIG. 8 is a view corresponding to C—C cross-section in the FIG. 7.

Next, explanation will be given on a third embodiment of the electric rotating machine, according to the present invention, by referring to FIGS. 7 and 8. That shown as this third embodiment differs from the second one in that a communicating passage 13d is provided in a portion of the coil support member 13 for communicating with an outer periphery side cooling passage 19.

Namely, this outer periphery side cooling passage 19 is provided between the holder ring 5 and the end portions 12B of the rotor coils, and it is formed penetrating through at the center of the connector portion 13b. With doing in this manner, flow amount of the coolant fluid 16d flowing through the inner support member space 13c is increased up, thereby promoting the cooling more. Also in this third embodiment, the structures being similar to that in the first embodiment also achieves the same effects to those.

Figure 9:
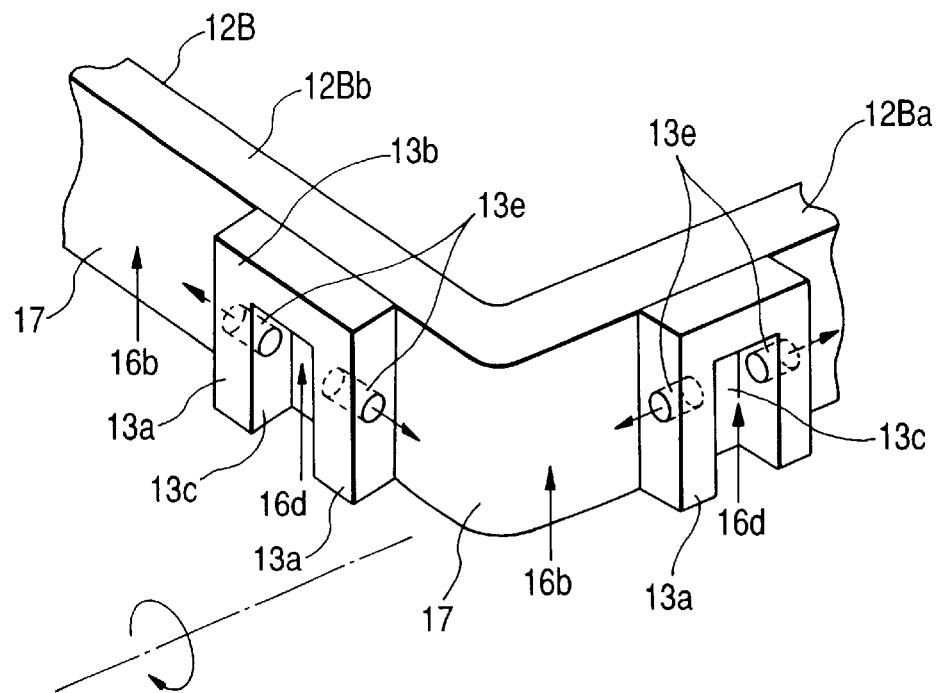
FIG. 9 is a perspective view for illustrating the end portion of the rotor coil and coil support members in the end portion of the rotor of the electric rotating machine, according to a fourth embodiment of the present invention.

Next, explanation will be given on a fourth embodiment of the electric rotating machine, according to the present invention, by referring to FIG. 9. That shown as this forth embodiment differs from the second one in that a communicating passage 13e is provided in a portion of the coil support member 13 for communicating with the inter support member spaces 17. With doing in this manner, flow amount of the coolant fluid flowing through the inner support member space 13c is increased up, thereby promoting the cooling more. Also in this fourth embodiment, the structures being similar to that in the first embodiment also achieves the same effects to those.

Figure 10:
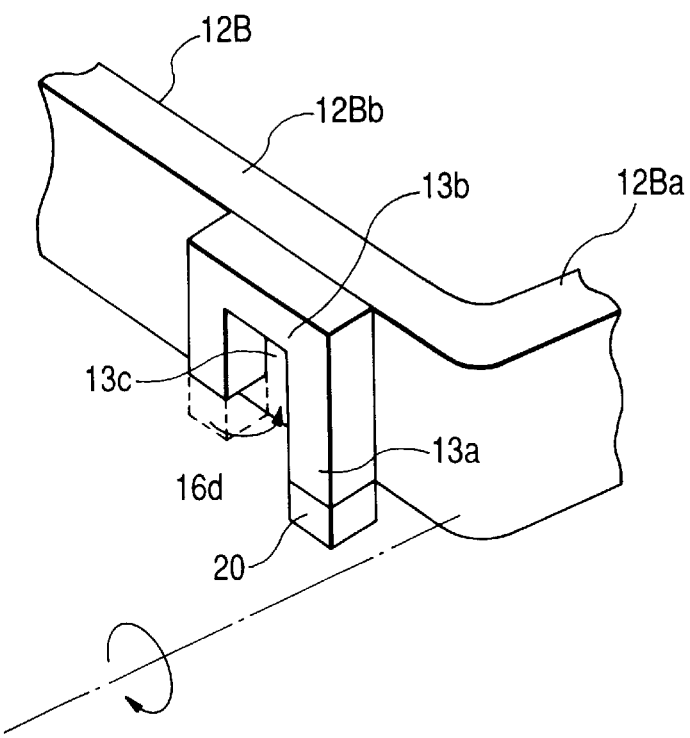
FIG. 10 is a perspective view for illustrating the end portion of the rotor coil and coil support members in the end portion of the rotor of the electric rotating machine, according to a fifth embodiment of the present invention.

Next, explanation will be given on a fifth embodiment of the electric rotating machine, according to the present invention, by referring to FIG. 10. That shown as this fifth embodiment differs from the second one in the structure that, while shortening a lower end portion of one of the insertion portions 13a of the coil support member 13, which is put between the end portions 12B of the rotor coils in the circumference direction thereof, a guide 20 is provided at the lower end of the other insertion portion 13a. With doing in this manner, it is possible to improve the cooling capacity, in particular where the component in the circumference direction of the coolant fluid 16d which flows into the inner support member space 13c is large. Also in this fifth embodiment, the structures being similar to that in the first embodiment also achieves the same effects to those.

According to the present invention, the cooling capacity in the end portions of the rotor coils can be improved with cheap structure, thereby obtaining an electric rotating machine, being superior in the reliability and small in sizes and large in the capacity thereof.

Also, with the coil support member being formed with the plural insertion portions extending in the radial direction and the connector portion connecting therebetween as one body, it is possible to prevent from the coil deformation over the radial direction and the longitudinal direction of the rotor coils with certainty, and as well as to obtain good workability in inserting the coil support members.

Furthermore, with forming the two (2) insertion portions and the connector portion connecting therebetween as one body in about "H" shape in the cross-section thereof, it is possible to make the coil support members have strong strength, thereby enabling to cool the both surfaces of the end portion of the rotor coil directly.

What is claimed is:

1. An electric rotating machine, having a stator, a rotor being positioned rotatable within the stator, and a communicating apparatus for communicating a coolant fluid within said electric rotating machine, wherein said rotor comprises:

a rotor core comprising a plurality of rotor slots;

a plurality of rotor coils, each coil inserted into a rotor slot at a central portion thereof and protrudes end portions thereof outside said rotor slot; and a plurality of coil support members having insulating property, being positioned between the plurality of end portions of the rotor coils at a distance therebetween, wherein at an inner peripheral side of said plural end portions of the rotor coils is formed a coil inner peripheral side aperture which is communicated with said coolant fluid, each of said coil support members comprises insertion portions, which are extended in a radial direction, and are formed in plural in a longitudinal direction of the coil, while abutting upon a surface of said rotor coil at both surfaces thereof, and a connector portion for connecting between said plural insertions portions, as one body, thereby forming inner-support member spaces between said insertion portions, each of which faces said rotor coil, and a recess portion is formed so that said inner-support member spaces are communicated with said coil inner peripheral side aperture at the inner peripheral side thereof.

2. An electric rotating machine as defined in claim 1, wherein a coil outer peripheral side cooling passage is formed at an outer periphery of the end portions of said rotor coils, and a communication passage is provided in said coil support member so that said inner-support member space and said coil outer peripheral side cooling passage are communicated with.

3. An electric rotating machine as defined in claim 1, wherein a communication passage is formed in said coil support member so as to communicate between said inner-support member space and other inter support member space.

4. An electric rotating machine, having a stator, a rotor being positioned rotatable within the stator, and a communicating apparatus for communicating a coolant fluid within said electric rotating machine, wherein said rotor comprises:

a rotor core comprising a plurality of rotor slots;

a plurality of rotor coils, each coil inserted into a rotor slot at a central portion thereof and protrudes end portions thereof outside said rotor slot; and a retaining ring being positioned so that it holds said plural end portions of the rotor coils and said coil support member at an outer periphery thereof, wherein at an inner peripheral side of said plural end portions of the rotor coils is formed a coil inner peripheral side aperture which is communicated with said coolant fluid, said coil support members and inter support member spaces adjacent thereto are positioned alternately, in a longitudinal direction of the coils, between the end portions of said plural rotor coils, while said inter support member spaces are communicated with said coil inner peripheral side aperture at an inner peripheral side thereof, said coil support member is formed with insertion portions which are extended in a radial direction and are formed in plural in a longitudinal direction of the coil, while abutting upon a surface of said rotor coil at both surfaces thereto, and a connection portion for connecting between said plurality of insertion portions, as one body in an about "H" shape in cross-section thereof, so as to form inner-support member spaces at both sides of said connector portion, each of which faces the end portion of said rotor coil, and those inner-support member spaces are communicated with said coil inner peripheral side aperture at the inner peripheral side thereof.

5. An electric rotating machine as defined in claim 4, wherein a communication passage is formed in said coil support member so as to communicate between said inner-support member space and other inter support member space.

6. An electric rotating machine as defined in claim 4, wherein a coil outer peripheral side cooling passage is formed at an outer periphery of the end portions of said rotor coils, and a communication passage is provided in said coil support member so that said inner-support member space and said coil outer peripheral side cooling passage are communicated with.

* * * * *